(12) United States Patent
Nicalek

(10) Patent No.: US 11,131,335 B1
(45) Date of Patent: Sep. 28, 2021

(54) UNIVERSAL COUPLING PIN KEY

(71) Applicant: Eugene Nicalek, Bradenton, FL (US)

(72) Inventor: Eugene Nicalek, Bradenton, FL (US)

( * ) Notice: Subject to any disclaimer, the term of this patent is extended or adjusted under 35 U.S.C. 154(b) by 332 days.

(21) Appl. No.: 16/372,634

(22) Filed: Apr. 2, 2019

(51) Int. Cl.
| | |
|---|---|
| F16B 21/12 | (2006.01) |
| B66F 15/00 | (2006.01) |
| B65H 75/40 | (2006.01) |
| B65H 75/44 | (2006.01) |
| F21V 33/00 | (2006.01) |
| F21V 23/04 | (2006.01) |
| B65H 75/48 | (2006.01) |
| H05B 45/37 | (2020.01) |
| F21Y 115/10 | (2016.01) |
| F21L 4/00 | (2006.01) |

(52) U.S. Cl.
CPC .......... *F16B 21/12* (2013.01); *B65H 75/406* (2013.01); *B65H 75/4471* (2013.01); *B65H 75/486* (2013.01); *B66F 15/00* (2013.01); *F21V 23/04* (2013.01); *F21V 33/0084* (2013.01); *H05B 45/37* (2020.01); *F21L 4/00* (2013.01); *F21Y 2115/10* (2016.08)

(58) Field of Classification Search
None
See application file for complete search history.

(56) References Cited

U.S. PATENT DOCUMENTS

| | | | |
|---|---|---|---|
| 2,732,148 A | 1/1956 | Lummis | |
| 2,880,435 A | 4/1959 | Deutsch | |
| 3,968,670 A | 7/1976 | Quenot | |
| 5,592,859 A | 1/1997 | Johnson | |
| 6,364,285 B1 | 4/2002 | Stinnett | |
| 6,487,756 B1 | 12/2002 | Vidal, Jr. | |
| D675,012 S | 1/2013 | Votel | |
| 10,359,251 B2 * | 7/2019 | Benson | B65H 75/4471 |
| 2005/0258203 A1 | 11/2005 | Weaver | |

\* cited by examiner

*Primary Examiner* — Vip Patel

(57) ABSTRACT

The universal coupling pin key is a fastening device. The universal coupling pin key forms a detent that attaches a first mechanical structure to a second mechanical structure. The universal coupling pin key further forms a simple tool that dislodges or prys apart a fastened mechanical structure formed from two components. The universal coupling pin key comprises a tool, a grip, a retractable tether, and a cable management system. The tool is the mechanical structure of the universal coupling pin key that fastens and detaches the mechanical structures. The grip is a handle used to manipulate the tool. The retractable tether attaches the tool and the grip to the cable management system. The cable management system deploys and retracts the tether. The cable management system further anchors the universal coupling pin key to an anchor point.

16 Claims, 3 Drawing Sheets

UNIVERSAL COUPLING PIN KEY

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of building including sewerage, more specifically, an accessory configured for use with a mechanical means for cleaning a sewer pipe. (E03F9/002)

SUMMARY OF INVENTION

The universal coupling pin key is a fastening device. The universal coupling pin key forms a detent that attaches a first mechanical structure to a second mechanical structure. The universal coupling pin key further forms a simple tool that dislodges or prys apart a fastened mechanical structure formed from two components. The universal coupling pin key comprises a tool, a grip, a retractable tether, and a cable management system. The tool is the mechanical structure of the universal coupling pin key that fastens and detaches the mechanical structures. The grip is a handle used to manipulate the tool. The retractable tether attaches the tool and the grip to the cable management system. The cable management system deploys and retracts the tether. The cable management system further anchors the universal coupling pin key to an anchor point.

These together with additional objects, features and advantages of the universal coupling pin key will be readily apparent to those of ordinary skill in the art upon reading the following detailed description of the presently preferred, but nonetheless illustrative, embodiments when taken in conjunction with the accompanying drawings.

In this respect, before explaining the current embodiments of the universal coupling pin key in detail, it is to be understood that the universal coupling pin key is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the universal coupling pin key.

It is therefore important that the claims be regarded as including such equivalent construction insofar as they do not depart from the spirit and scope of the universal coupling pin key. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
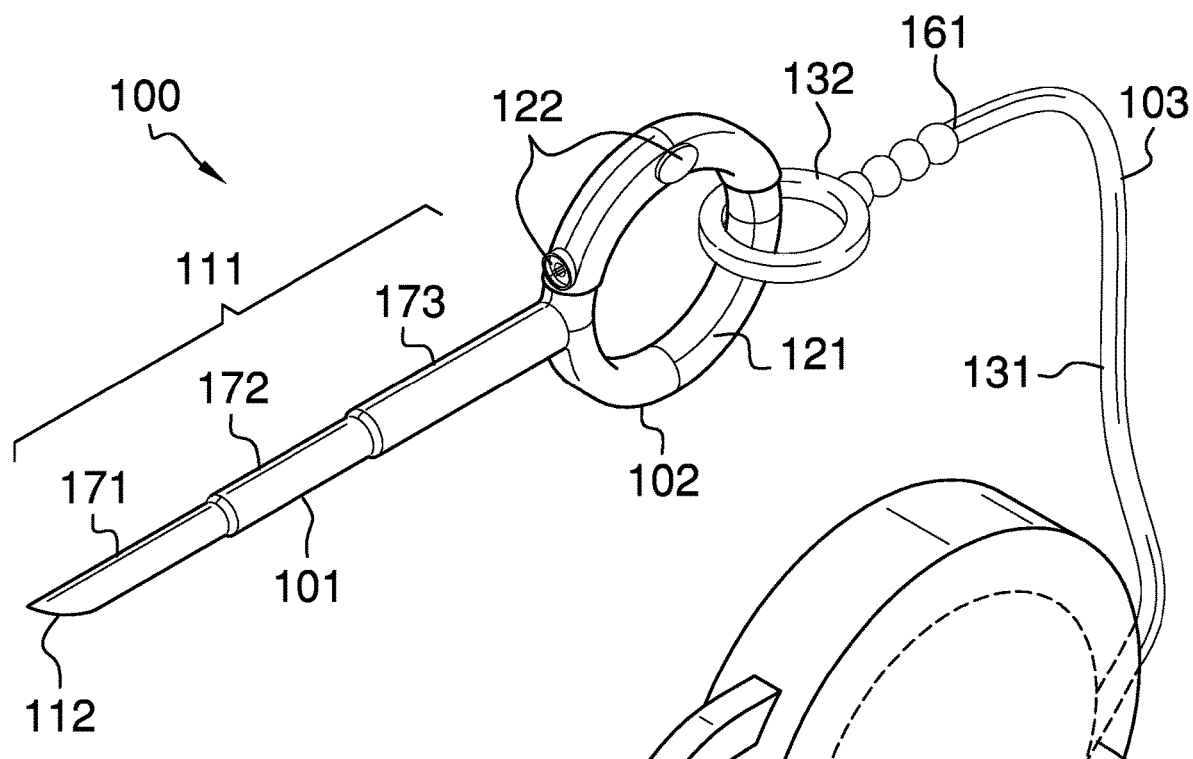
FIG. 1 is a perspective view of an embodiment of the disclosure.
Figure 2:
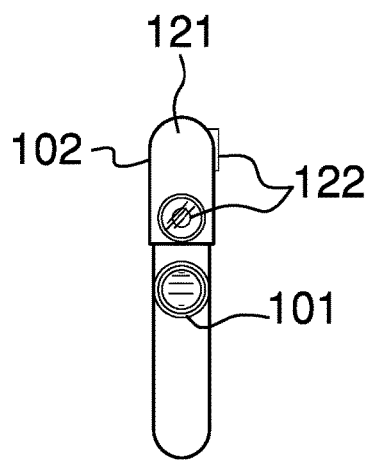
FIG. 2 is a front view of an embodiment of the disclosure.
Figure 3:
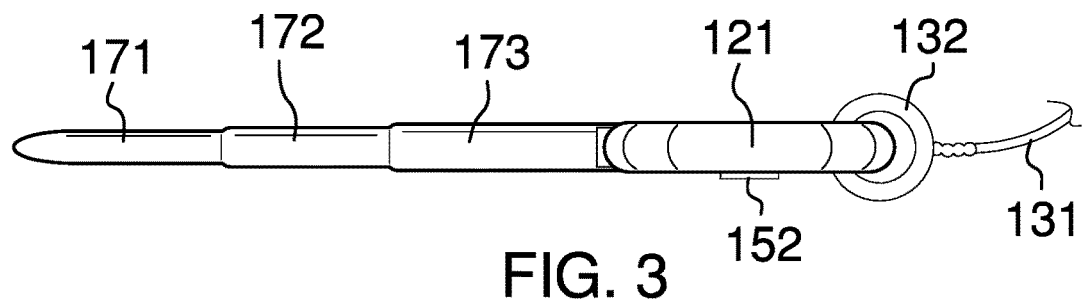
FIG. 3 is a top view of an embodiment of the disclosure.
Figure 4:
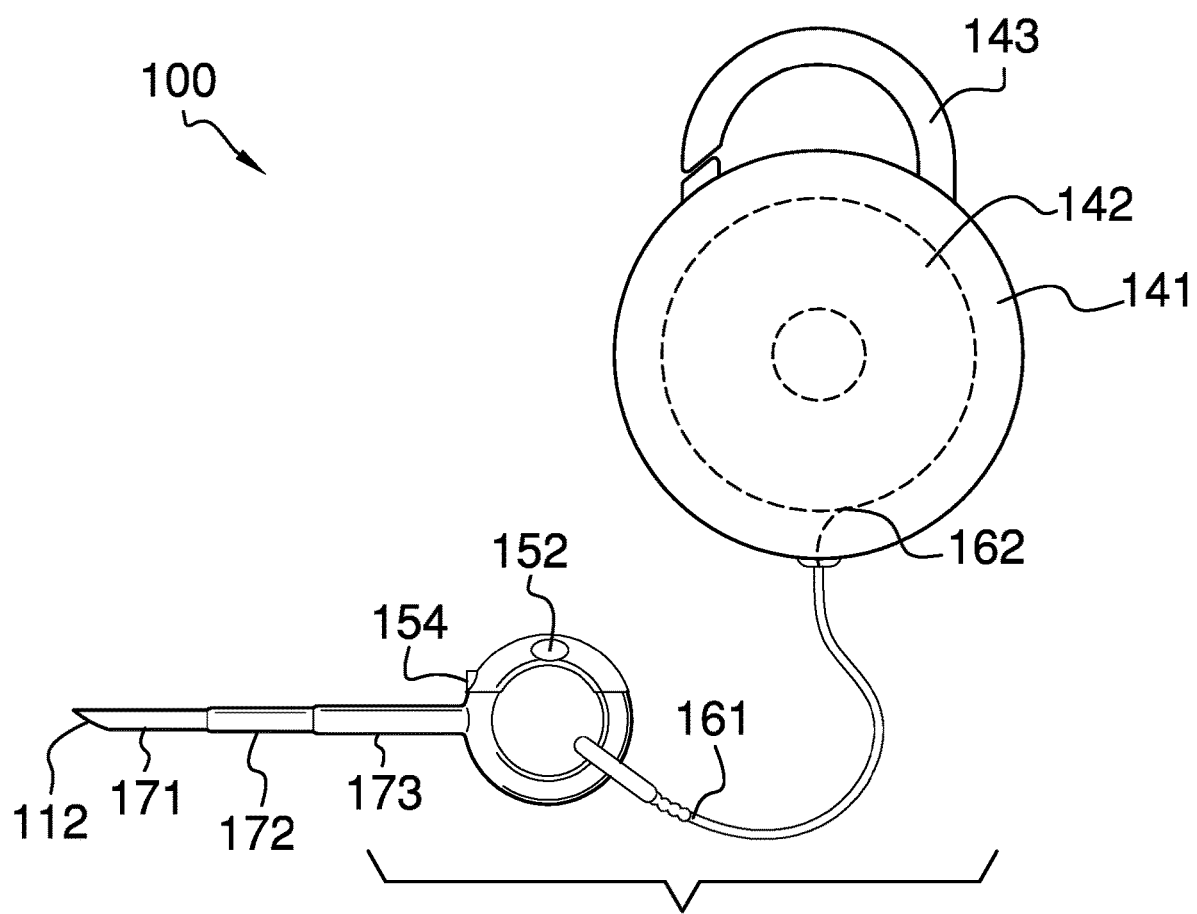
FIG. 4 is a detail view of an embodiment of the disclosure.
Figure 5:
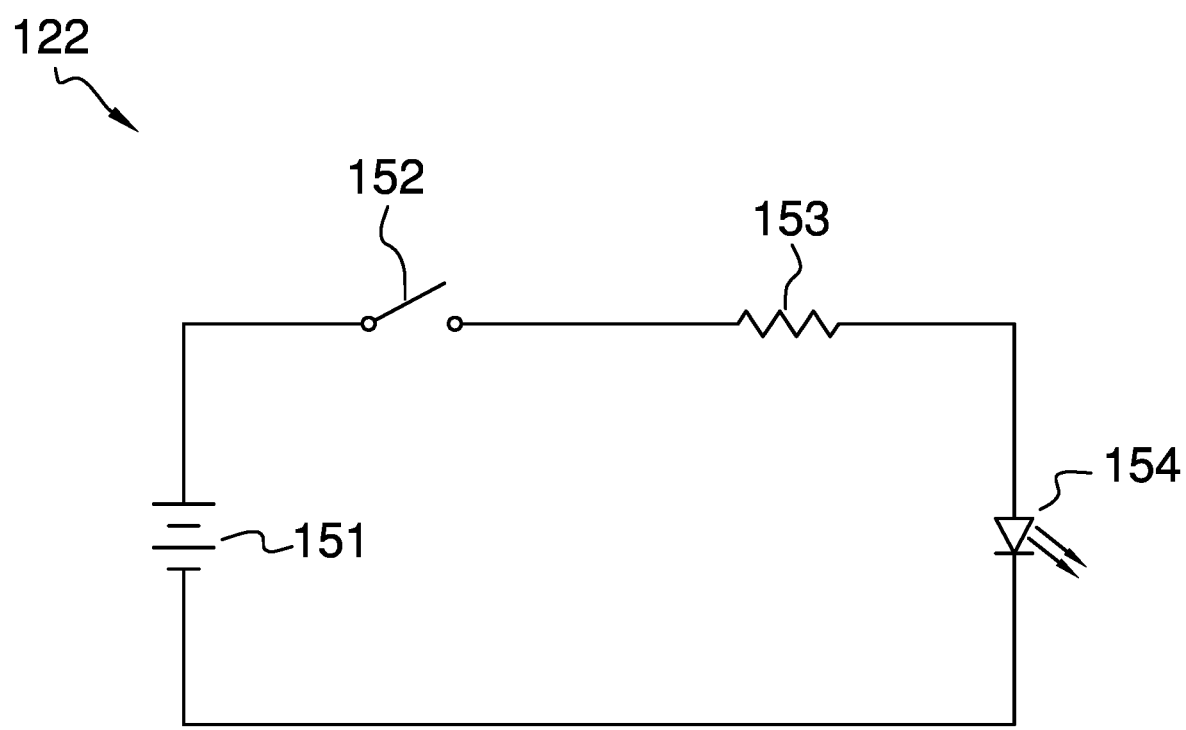
FIG. 5 is a schematic view of an embodiment of the disclosure.

Detailed reference will now be made to one or more potential embodiments of the disclosure, which are illustrated in FIGS. 1 through 5.

The universal coupling pin key 100 (hereinafter invention) is a fastening device. The invention 100 forms a detent that attaches a first mechanical structure to a second mechanical structure. The invention 100 further forms a simple tool 101 dislodges or prys apart a fastened mechanical structure formed from two components. The invention 100 comprises a tool 101, a grip 102, a retractable tether 103, and a cable management system 104. The tool 101 is the mechanical structure of the invention 100 that fastens and detaches the mechanical structures. The grip 102 is a handle used to manipulate the tool 101. The retractable tether 103 attaches the tool 101 and the grip 102 to the cable management system 104. The cable management system 104 deploys and retracts the retractable tether 103. The cable management system 104 further anchors the invention 100 to an anchor point.

The tool 101 is a mechanical device. The tool 101 is a cotter pin for a sewer cable. The tool 101 is a simple machine further used to separate two fastened objects. The tool 101 forms a wedge. The tool 101 forms a lever. The tool 101 attaches to the grip 102. The tool 101 comprises a cotter pin 111 and a leverage element 112.

The cotter pin 111 is a composite prism structure. The cotter pin 111 forms the primary structure of the tool 101. The cotter pin 111 inserts through apertures formed through two different elements within the sewer cable such that the cotter pin 111 attaches the two different elements within the sewer cable together. The composite prism structure of the cotter pin 111 presents a range of outer diameters across the span of the length of the center axis of the composite prism.

This variation in outer diameter across the cotter pin 111 allows the cotter pin 111 to be used across a range of different sewer cable configurations. The cotter pin 111 is defined in greater detail elsewhere in this disclosure. The cotter pin 111 comprises a first prism structure 171, a second prism structure 172, and a third prism structure 173.

The third prism structure 173 is a prism-shaped structure. The third prism structure 173 attaches to the ring 121 such that the center axis of the third prism structure 173 projects radially away from the center axis of the ring 121.

The second prism structure 172 is a prism-shaped structure. The second prism structure 172 is geometrically similar to the third prism structure 173. The outer diameter of the second prism structure 172 is lesser than the outer diameter of the third prism structure 173. The second prism structure 172 attaches to the third prism structure 173 such that the second prism structure 172 and the third prism structure 173 form a composite prism structure.

The first prism structure 171 is a prism-shaped structure. The first prism structure 171 is geometrically similar to the second prism structure 172. The outer diameter of the first prism structure 171 is lesser than the outer diameter of the second prism structure 172. The first prism structure 171 attaches to the second prism structure 172 such that the first prism structure 171 and the second prism structure 172 forms a composite prism structure.

The leverage element 112 is the working element of the tool 101. The leverage element 112 is a bevel formed in the free end of the first prism structure 171. The leverage element 112 forms a wedge used to separate two fastened objects. The leverage element 112 further forms a shaft used as a lever to separate two fastened objects.

The grip 102 forms a handle used to manipulate the tool 101. The grip 102 illuminates the tool 101 when the tool 101 is in use. The grip 102 comprises a ring 121 and a lamp 122.

The ring 121 is a loop structure. The ring 121 is defined in greater detail elsewhere in this disclosure. The fixed end of the cotter pin 111 attaches to the ring 121 such that the cotter pin 111 projects radially away from the center axis of the ring 121. The aperture formed through the ring 121 allows for the grip 102 to be grasped during the use of the tool 101.

The lamp 122 is an electrical circuit. The lamp 122 generates an illumination that is targeted at the tool 101. The lamp 122 illuminates the space in which the tool 101 is used. The lamp 122 is defined in greater detail elsewhere in this disclosure. The lamp 122 comprises a battery 151, a master switch 152, a limit resistor 153, and a LED 154.

The battery 151 is an electrochemical device. The battery 151 converts chemical potential energy into the electrical energy used to power the lamp 122. The master switch 152 is an electrical switch. The master switch 152 is a maintained switch. The master switch 152 controls the flow of electricity out of the battery 151 into the limit resistor 153, and the LED 154. The limit resistor 153 is an electrical resistor. The limit resistor 153 limits the flow of electricity into the LED 154. The LED 154 is a two-terminal semiconducting circuit. The LED 154 generates the light used to illuminate the tool 101. The battery 151, the master switch 152, the limit resistor 153, and the LED 154 form a series electrical circuit. The battery 151, the master switch 152, the limit resistor 153, and the LED 154 are defined in greater detail elsewhere in this disclosure.

The retractable tether 103 is an extension structure that attaches the grip 102 to the cable management system 104. The span of the reach of the retractable tether 103 adjusts such that the grip 102 and the tool 101 can be retracted for storage or extended for use. The retractable tether 103 comprises a cord 131 and a first carabiner 132. The cord 131 is further defined with a first end 161 and a second end 162.

The cord 131 is a flexible linear structure. The cord 131 has tensile strength. The cord 131 does not have compressive strength. The cord 131 forms the extension structure of the retractable tether 103. The cord 131 attaches the grip 102 to the cable management system 104. The cord 131 deploys from the cable management system 104 and retracts into the cable management system 104. The cord 131 sets the reach between the grip 102 and the cable management system 104. The cord 131 is defined in greater detail elsewhere in this disclosure.

The first carabiner 132 is a well-known and documented fastening structure. The first carabiner 132 attaches the first end 161 of the cord 131 to the ring 121. The first carabiner 132 is defined in greater detail elsewhere in this disclosure.

The cable management system 104 is a structure that contains the retractable tether 103. The cable management system 104 controls the reach of the retractable tether 103. The cable management system 104 anchors to an anchor point. The cable management system 104 comprises a housing 141, a roller clutch and spring system 142, and a second carabiner 143.

The housing 141 is a rigid casing. The housing 141 contains the roller clutch and spring system 142. The second carabiner 143 attaches to the exterior of the housing 141. The housing 141 is formed with all apertures and form factors necessary to allow the housing 141 to accommodate the use and operation of the invention 100. Methods to form a housing 141 suitable for the purposes described in this disclosure are well-known and documented in the mechanical arts.

The roller clutch and spring system 142 is a well-known and documented spooling structure. The second end 162 of the cord 131 attaches to the roller clutch and spring system 142. The roller clutch and spring system 142 is a ratchet based system that deploys the cord 131 from the housing 141. The roller clutch and spring system 142 has a spring mechanism that retracts the cord 131 into the housing 141 when the ratchet is released. The roller clutch and spring system 142 is defined in greater detail elsewhere in this disclosure.

The second carabiner 143 is a well-known and documented fastening structure. The second carabiner 143 attaches to the exterior surface of the housing 141. The second carabiner 143 anchors the housing 141 to an anchor point. The anchor point is beyond the scope of this disclosure. The second carabiner 143 is defined in greater detail elsewhere in this disclosure.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anchor: As used in this disclosure, anchor means to hold an object firmly or securely.

Anchor Point: As used in this disclosure, an anchor point is a location to which a first object can be securely attached to a second object.

Battery: As used in this disclosure, a battery is a chemical device consisting of one or more cells, in which chemical energy is converted into electricity and used as a source of power. Batteries are commonly defined with a positive terminal and a negative terminal.

Bevel: As used in this disclosure, a bevel is a slope that is formed in the edge or surface of an object.

Carabiner: As used in this disclosure, a carabiner is coupling link that is usually formed as an oblong metal ring with one spring hinged side that is used to open and close the ring. Synonyms for carabiner include D-link.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Cord: As used in this disclosure, a cord is a long, thin, flexible, and prism-shaped string, line, rope, or wire. Cords are made from yarns, piles, or strands of material that are braided or twisted together or from a monofilament (such as fishing line). Cords have tensile strength but are too flexible to provide compressive strength and are not suitable for use in pushing objects. String, line, cable, and rope are synonyms for cord.

Correspond: As used in this disclosure, the term correspond is used as a comparison between two or more objects wherein one or more properties shared by the two or more objects match, agree, or align within acceptable manufacturing tolerances.

Cotter Pin: As used in this disclosure, a cotter pin is a metal shaft that is used to hold two mechanical components together.

Detent: As used in this disclosure, a detent is a device for attaching a first object to a second object in a detachable manner such that: 1) the position of the first object relative to the second object is adjustable; and, 2) the first object is attached to the second object in a detachable manner.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Extension Structure: As used in this disclosure, an extension structure is an inert physical structure that is used to extend or bridge the reach between any two objects.

Fixed End: As used in this disclosure, a fixed end refers to the end of a shaft, pipe, or tube that attaches to an object.

Form Factor: As used in this disclosure, the term form factor refers to the size and shape of an object.

Free End: As used in this disclosure, a free end refers to the end of a shaft, pipe, or tube that is not attached to an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Housing: As used in this disclosure, a housing is a rigid casing that encloses and protects one or more devices.

Inner Dimension: As used in this disclosure, the term inner dimension describes the span from a first inside or interior surface of a container to a second inside or interior surface of a container. The term is used in much the same way that a plumber would refer to the inner diameter of a pipe.

Lamp: As used in this disclosure, a lamp is an electrical device that generates visible light to illuminate objects so they can be seen.

LED: As used in this disclosure, an LED is an acronym for a light emitting diode. A light emitting diode is a diode that is also a light source.

Lever: As used in this disclosure, a lever is a simple machine that comprises a shaft that rotates around a fulcrum or pivot point.

Limit Resistor: As used in this disclosure, a limit resistor is an electrical resistor that is used to limit the flow of electric current through an electrical circuit.

Loop: As used in this disclosure, a loop is the length of a first linear structure including, but not limited to, shafts, lines, cords, or ribbons, that is: 1) folded over and joined at the ends forming an enclosed space; or, 2) curved to form a closed or nearly closed space within the first linear structure. In both cases, the space formed within the first linear structure is such that a second linear structure such as a line, cord or a hook inserts through the space formed within the first linear structure. Within this disclosure, the first linear structure is said to loop around the second linear structure.

Maintained Switch: A used in this disclosure, a maintained switch is a switch that maintains the position that was set in the most recent switch actuation. A maintained switch works in an opposite manner to a momentary switch.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Radial: As used in this disclosure, the term radial refers to a direction that: 1) is perpendicular to an identified central axis; or, 2) projects away from a center point.

Reach: As used in this disclosure, reach refers to a span of distance between any two objects.

Resistor: As used in this disclosure, a resistor is a well-known and commonly available electrical device that inhibits the flow of electricity through an electric circuit. Within an electric circuit processing alternating currents, the resistor will not affect the phase of the alternating current. A current flowing through a resistor will create a voltage across the terminals of the resistor.

Ring: As used in this disclosure, a ring is a term that is used to describe a disk-like structure through which an aperture is formed. Rings are often considered loops.

Roll: As used in this disclosure, a roll is a method of storing paper or other sheeting in a cylindrical structure such that creases are not formed within the paper or sheeting. To form the roll, the paper or other sheeting material is curved over itself around a center axis such that a spiral is formed when the roll is viewed from the end of the cylindrical structure.

Roller Clutch and Spring System: As used in this disclosure, a roller clutch and spring system is a commercially available system for storing a sheeting on a scroll or loading a cord on a spool. The sheeting is stored on a rotating cylindrical roller as the scroll. The cord is stored on the spool. The clutch portion of the roller clutch and spring system is configured to allow the rotating cylindrical roller to rotate in a first direction. The spring portion of the roller clutch and spring system is configured to return the rotating cylindrical roller to its original position when the clutch portion is released. A common example of the roller clutch and spring system is the mechanism used to raise and lower window blinds.

Scroll: As used in this disclosure, a scroll is a sheeting that is stored as a roll.

Simple Machine: As used in this disclosure, a simple machine refers to a device that consists of a mechanism selected from the group consisting of: 1) an inclined plane, 2) a lever; 3) a pivot, 4) a pulley, 5) a screw, 6) a spring, 7) a wedge, and 8) a wheel (including axles). A compound machine is a device that consists of a plurality of mechanisms selected from the group consisting of the simple machine.

Spool: As used in this disclosure, a spool is a cylindrical device upon which a flexible material, including but not limited to a yarn, a cord, or a tape, can be wound. Depending on context, a spool may also contain the flexible material stored upon the spool.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Tether: As used in this disclosure, a tether is a cord, line, webbing, or strap that is attached to an object to restrict its movement.

Tool: As used in this disclosure, a tool is a device, an apparatus, or an instrument that is used to carry out an activity, operation, or procedure.

Truncated: As used in this disclosure, a geometric object is truncated when an apex, vertex, or end is cut off by a line or plane.

Wedge: As used in this disclosure, a wedge is an inclined structure that inserts into a narrow opening, or fissure, for the purpose of: 1) separating the narrow opening; 2) placing the wedge tightly into the narrow opening for use as a lever; or, 3) placing the wedge tightly into the narrow opening for use in preventing movement.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 5 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A coupling device comprising:
   a tool, a grip, a retractable tether, and a cable management system;
   wherein the grip attaches the tool to the retractable tether;
   wherein the retractable tether attaches the grip to the cable management system;
   wherein the grip is a handle;
   wherein the cable management system deploys and retracts the retractable tether;

wherein the cable management system further anchors the coupling device to an anchor point;
wherein the tool is a cotter pin for a sewer cable;
wherein the tool further forms a wedge;
wherein the tool further forms a lever;
wherein the grip forms a handle;
wherein the grip illuminates the tool;
wherein the retractable tether is an extension structure that attaches the grip to the cable management system;
wherein the span of the reach of the retractable tether adjusts such that the grip and the tool can retract and extend.

2. The coupling device according to claim 1
wherein the cable management system is a structure that contains the retractable tether;
wherein the cable management system controls the reach of the retractable tether;
wherein the cable management system anchors to an anchor point.

3. The coupling device according to claim 1
wherein the tool comprises the cotter pin and a leverage element;
wherein the leverage element is formed in the cotter pin.

4. The coupling device according to claim 3
wherein the grip comprises a ring and a lamp;
wherein the ring contains the lamp;
wherein the ring is a loop structure;
wherein the lamp is an electrical circuit;
wherein the lamp generates an illumination targeted at the tool.

5. The coupling device according to claim 4
wherein the retractable tether comprises a cord and a first carabiner;
wherein the cord is further defined with a first end and a second end;
wherein the first carabiner attaches the first end of the cord to the ring.

6. The coupling device according to claim 5
wherein the cable management system comprises a housing, a roller clutch and spring system, and a second carabiner;
wherein the housing contains the roller clutch and spring system;
wherein the second carabiner attaches to the housing.

7. The coupling device according to claim 6
wherein the cotter pin is a composite prism structure;
wherein the cotter pin inserts through apertures formed through the sewer cable such that the cotter pin attaches the sewer cable together.

8. The coupling device according to claim 7 wherein the composite prism structure of the cotter pin presents a range of outer diameters across the span of the length of the center axis of the composite prism.

9. The coupling device according to claim 8
wherein the leverage element is the working element of the tool;
wherein the leverage element is a bevel;
wherein the leverage element forms a wedge used to separate two fastened objects;
wherein the leverage element further forms a shaft used as a lever to separate two fastened objects.

10. The coupling device according to claim 9
wherein the cotter pin comprises a first prism structure, a second prism structure, and a third prism structure;
wherein the third prism structure is a prism-shaped structure;
wherein the second prism structure is a prism-shaped structure;
wherein the second prism structure is geometrically similar to the third prism structure;
wherein the first prism structure is a prism-shaped structure;
wherein the first prism structure is geometrically similar to the second prism structure;
wherein the outer diameter of the second prism structure is lesser than the outer diameter of the third prism structure;
wherein the outer diameter of the first prism structure is lesser than the outer diameter of the second prism structure.

11. The coupling device according to claim 10 wherein the third prism structure attaches to the ring such that the center axis of the third prism structure projects radially away from the center axis of the ring.

12. The coupling device according to claim 11
wherein the second prism structure attaches to the third prism structure such that the second prism structure and the third prism structure form a composite prism structure;
wherein the first prism structure attaches to the second prism structure such that the first prism structure and the second prism structure forms a composite prism structure;
wherein the leverage element is formed in the free end of the first prism structure.

13. The coupling device according to claim 12
wherein the lamp comprises a battery, a master switch, a limit resistor, and an LED;
wherein the battery, the master switch, the limit resistor, and the LED form a series electrical circuit.

14. The coupling device according to claim 13
wherein the battery is an electrochemical device;
wherein the master switch is a maintained switch;
wherein the master switch controls the flow of electricity out of the battery into the limit resistor, and the LED;
wherein the limit resistor is an electrical resistor;
wherein the limit resistor limits the flow of electricity into the LED;
wherein the LED is a two-terminal semiconducting circuit;
wherein the LED generates the light used to illuminate the tool.

15. The coupling device according to claim 14
wherein the cord is a flexible linear structure;
wherein the cord sets the reach between the grip and the cable management system;
wherein the cord attaches the grip to the cable management system;
wherein the cord deploys from the cable management system and retracts into the cable management system.

16. The coupling device according to claim 15
wherein the housing is a rigid casing;
wherein the second end of the cord attaches to the roller clutch and spring system;
wherein the roller clutch and spring system is a ratchet based system that deploys the cord from the housing;
wherein the roller clutch and spring system has a spring mechanism that retracts the cord into the housing when the ratchet is released;
wherein the second carabiner anchors the housing to an anchor point.

* * * * *